F. J. TANNER & E. F. GRIFFIN.
TYPE WRITING MACHINE.
APPLICATION FILED JAN. 9, 1907.

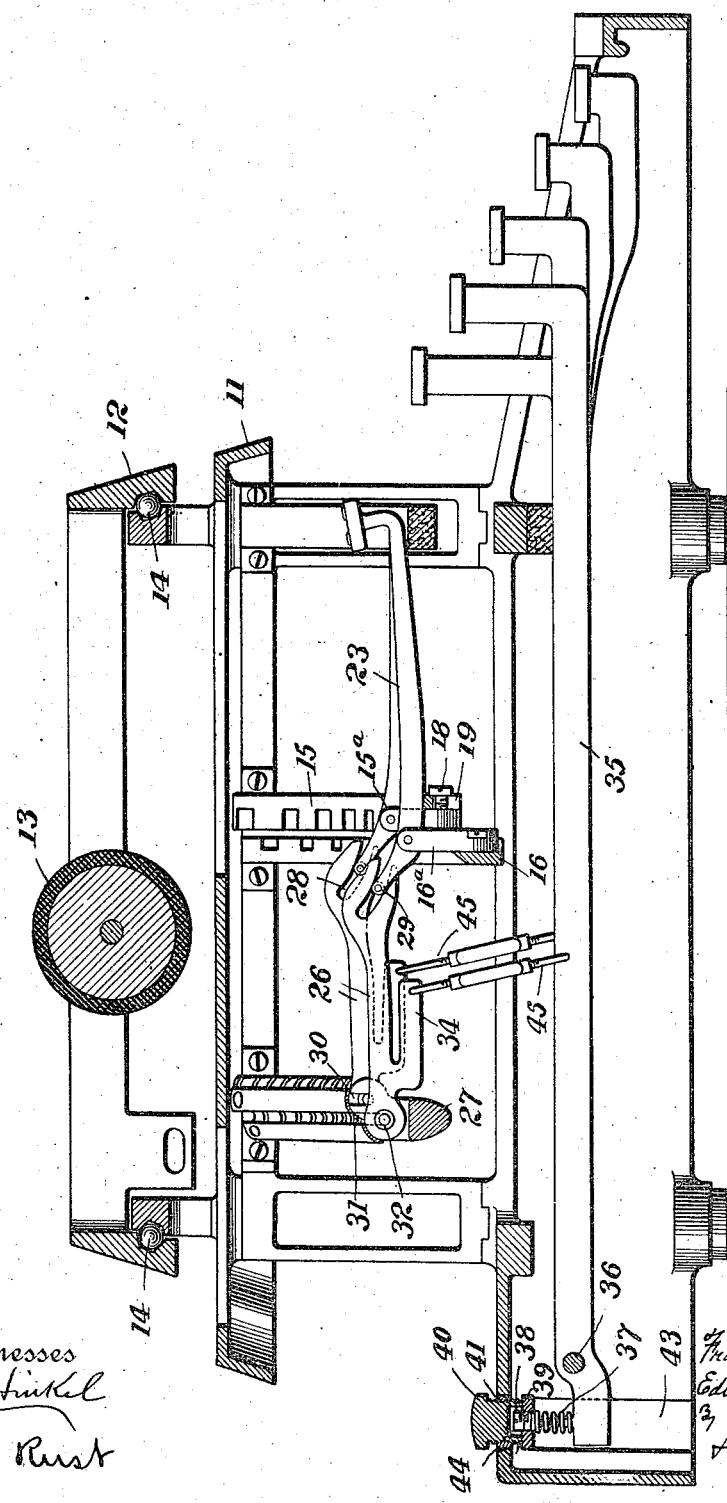

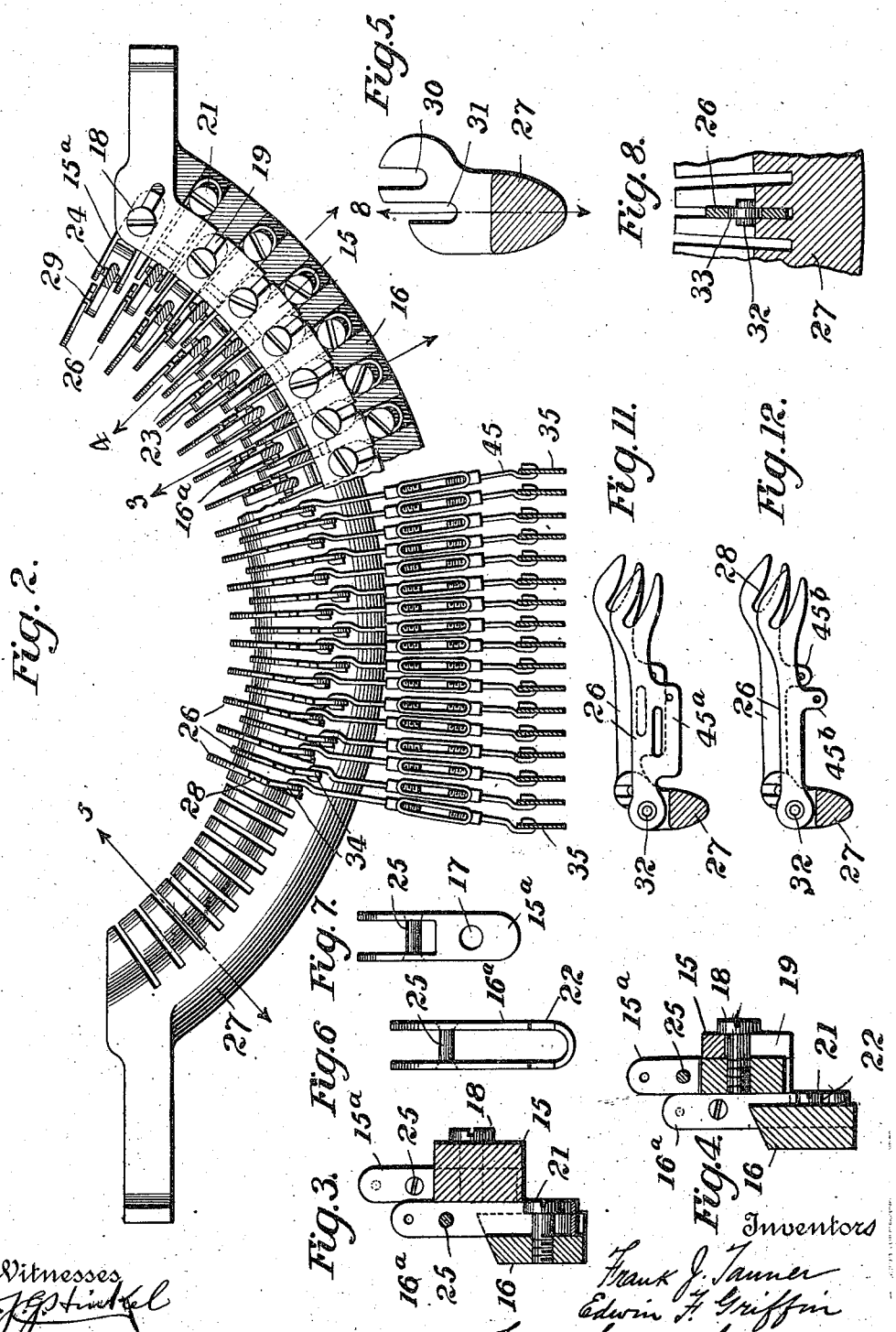

996,538.

Patented June 27, 1911.

3 SHEETS—SHEET 3.

Witnesses
J. G. Hinkel
A. C. Rust

Inventors
Frank J. Tanner
Edwin F. Griffin
By Foster Freeman Watson
Attorneys

UNITED STATES PATENT OFFICE.

FRANK J. TANNER AND EDWIN F. GRIFFIN, OF SCRANTON, PENNSYLVANIA, ASSIGNORS TO INTERNATIONAL TEXT BOOK COMPANY, OF SCRANTON, PENNSYLVANIA, A CORPORATION OF PENNSYLVANIA.

TYPE-WRITING MACHINE.

996,538.  Specification of Letters Patent.  Patented June 27, 1911.

Application filed January 9, 1907. Serial No. 351,537.

*To all whom it may concern:*

Be it known that we, FRANK J. TANNER and EDWIN F. GRIFFIN, citizens of the United States, and residents of Scranton, Lackawanna county, State of Pennsylvania, have invented certain new and useful Improvements in Type-Writing Machines, of which the following is a specification.

The present invention relates to typewriting machines of the variety known as visible or front-strike machines, and more particularly to the type bars, key-levers and intermediate connections.

The object of the invention is to provide a lever system for front-strike typewriting machines which is simple, easily constructed, durable and adapted to be operated with a light "touch".

Figure 9:
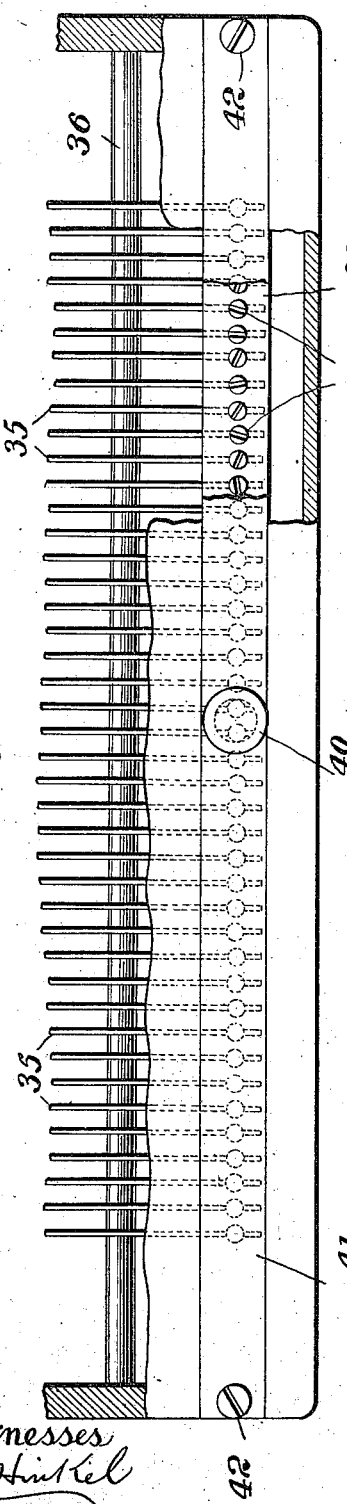
Figure 10:
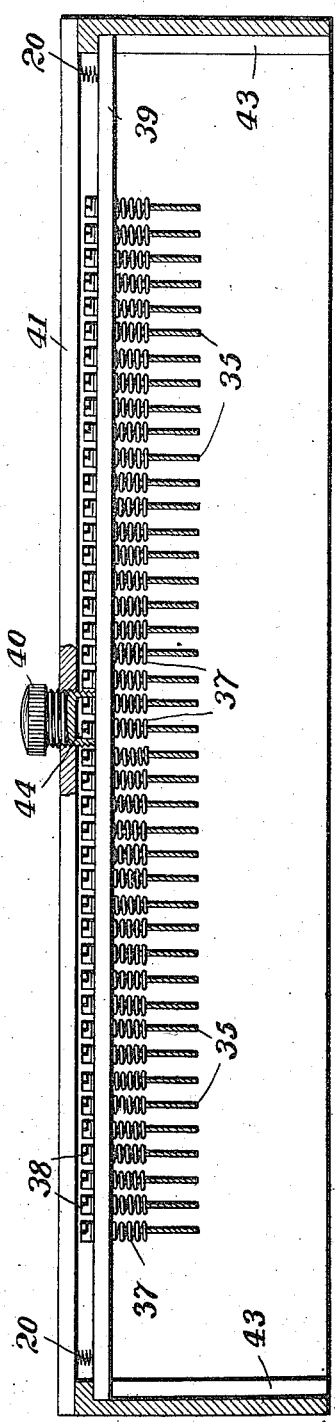

The invention will be described in connection with the accompanying drawing, in which, Figure 1 is a central vertical section from front to rear of a typewriting machine embodying the invention; Fig. 2 is a front view illustrating on the right the type bar segment, in the middle portion the sublevers mounted in the sub-lever segment and on the left the sub-lever segment with the sublevers removed; Fig. 3 is a section on the line 3—3 of Fig. 2; Fig. 4 is a section on the line 4—4 of Fig. 2; Fig. 5 is a section on the line 5—5 of Fig. 2; Fig. 6 is a front view of one of the rear type bar hangers; Fig. 7 is a like view of one of the front type bar hangers; Fig. 8 is a section on the line 8, Fig. 5, showing one of the sub-lever pivots in place in its bearings; Fig. 9 is a plan of the rear ends of the key levers showing their tension devices; and Fig. 10 is a rear elevation of the key levers and their tension devices; Figs. 11 and 12 show modified forms of the sub-levers.

Referring to the drawing, 11 indicates the fixed frame of the machine, 12 the carriage, 13 the platen and 14 the carriage bearings. These parts may be of any desired construction and do not constitute a part of the present invention.

The type bar support or segment comprises two independent segmental bars upon each of which alternate type bars are supported. One segmental bar 15 is supported in front of and slightly above the other segmental bar 16. The type bar hangers 15ª of the front segment are U-shaped and provided with solid lower portions having threaded openings 17 to receive the screws 18, which are passed through the segmental bar from the front into the hanger, as shown in Figs. 2, 4 and 7. The segment is preferably slotted at its lower side from front to rear so that a hanger can be detached by loosening one of the screws 18 without removing the screw entirely from the hanger, the shanks of the screws being adapted to pass out through the slots 19.

The rear segment 16 has hangers 16ª which are secured in place by screws 21 which pass through the hangers and are threaded into the segment. The hangers are preferably notched, as at 22, to receive the heads of the screws 21. By means of the described arrangement of segments and hangers, we are enabled to stagger the hangers and provide relatively wide bearings for the type bars, while, at the same time, any individual hanger may be removed easily and without disturbing the adjacent hangers. By arranging the forward segment above the rear segment the screws in both segments are rendered accessible from the front of the machine and a hanger may be easily removed from either segment.

The manner of mounting the type bar in the hanger may be varied. As shown, each type bar 23 is provided with a pivot pin 24 having conical ends adapted to conical bearings in the arms of the hanger and the arms of each hanger are connected by a screw 25 for adjusting the bearings of the type bar. In the rear of each type bar is a substantially horizontal sub-lever 26 pivoted to a segment 27 at its rear end and having a slot 28 in which operates a pin or roller 29 projecting laterally from the rear end of the adjacent type bar, as shown in Figs. 1 and 2. The sub-levers 26 are arranged substantially in the planes of their respective type bars and their rear ends are pivoted in the segment 27. The sub-levers which operate the type bars of the upper type bar segment are pivoted in upper notches 30 of the segment 27, while the sub-levers which operate the type bars of the lower segment are pivoted in lower notches 31 of the segment 27, as shown in Figs. 1 and 5. Each of the sublevers is preferably provided with trunnions 32 adapted to work in the notches 30, 31, the trunnions being connected with a bushing 33 which is tightly fitted in the sub-lever, as shown in Figs. 1 and 8. The slots 28 in the forward ends of the sub-levers are of such form as to impart to the type bars an accelerating movement during the latter part of their travel as they are thrown up to the platen. The sub-levers have downwardly projecting angular extensions 34 which will be referred to hereinafter.

The key levers 35 are mounted in the usual location in the base of the machine, and arranged in the usual manner. As shown, they are pivoted upon a rod 36 at the rear of the machine and each lever is provided with a spring 37 which normally holds its forward end in elevated position. Each spring 37 is provided with an adjusting screw 38 by means of which its tension can be adjusted. The screws 38 are mounted in a common bar 39 which bar can be adjusted to vary the tension upon all of the key levers simultaneously by means of a central screw 40 mounted in a bar 41, which is connected by screws 42 to the frame of the machine. The ends of the bar 39 are guided in notches or slots 43 in the frame and the bar is kept substantially horizontal by two springs 20 bearing upon its ends. As shown the screw 40 is of large diameter and has a wide bearing on the bar 39 and a recess 44 is formed in the screw to receive the heads of the screws 38 beneath it. The key levers are connected with the sub-levers by means of adjustable links 45, which may be of any desired construction.

The sub-levers are arranged substantially in planes of their respective type bars, that is, in planes converging to a line passing through the printing point on the platen. The distance between the outside key levers is somewhat greater than the distance between the outside type bars and sub-levers and the connecting links 45 therefore converge from the key levers to the sub-levers, as shown in Fig. 2. The downwardly extending extensions or lugs 34 of the sub-levers are arranged at varying angles to the planes of their respective sub-levers, depending upon the angle between the plane of the sub-lever and the connection of its key lever and also depending upon the clearance necessary between the lugs of the different sub-levers. These depending lugs form a convenient means of connecting the links 45 to the sub-levers while arranging the connections so as to clear one another in operation. It is not essential that the depending lug should be in line with its connection 45, but it is preferable to have it approximately so. In Fig. 1, the lugs 34 are shown as parallel with the sub-levers and connected at their rear ends. The forward ends are therefore free to be adjusted angularly and bodily to any desired position with respect to the sub-lever. In Fig. 11 is shown a lug 45$^a$ parallel with the sub-lever and connected at both its front and rear ends. These lugs are stiffer and stronger but do not afford the same range of adjustment. In Fig. 12 lugs 45$^b$ are shown which are staggered so that adjacent lugs cannot interfere. While these lugs are staggered they are approximately in the same positions with respect to their sub-levers.

It will be evident that various changes in details of construction and arrangement may be effected without departing from the spirit and scope of our invention. For instance, the arrangement of the connections between the sub-levers and type bars may be reversed, the slots being formed in the type bars and the pins and rollers placed upon the sub-levers. We prefer however the arrangement illustrated in the drawing but do not desire to be limited to the exact details thereof.

What we claim and desire to secure by Letters Patent is,

1. In a typewriting machine, a segment comprising two independent segmental bars in combination with hangers arranged intermediate of and on the opposite faces of said bars, alternate hangers being connected to each bar, and type bars mounted in said hangers.

2. In a typewriting machine, a segment comprising two independent segmental bars in combination with hangers arranged on the opposite substantially vertical faces of said bars, alternate hangers being connected to each bar, and type bars mounted in said hangers, one of said segmental bars being arranged above and in front of the other.

3. In a typewriting machine, a segment comprising two independent segmental bars in combination with hangers arranged on the opposite substantially vertical faces of said bars, alternate hangers being connected to each bar, and type bars mounted in said hangers, one of said segmental bars being of shorter radius than the other and arranged above and co-axial with it.

4. In a typewriting machine, a segment comprising two independent segmental bars arranged one above and in front of the other, the front bar being of shorter radius than the rear bar, in combination with hangers arranged between said bars on the opposing faces thereof, alternate hangers being connected to each bar, and type bars mounted in said hangers.

5. In a typewriting machine, a segment comprising two segmental bars one being of shorter radius than the other and the bar of shorter radius being forward of the other, type bar hangers connected alternately to said bars on the opposing faces thereof, screws passing through the forward segmental bar and threaded into the hangers thereof, screws passing through the hangers of the rear segmental bar and threaded into said bar, and type bars mounted in said hangers.

6. In a front strike typewriting machine, the combination with a type bar segment and a series of type bars pivotally mounted thereon, of a sub-lever segment in the rear of the type bar segment, and a series of horizontally arranged sub-levers pivotally mounted thereon, and key levers and links for operating said sub-levers, the several sub-levers having depending lugs to which said links are connected.

7. In a front strike typewriting machine, the combination with a type bar segment and a series of type bars pivotally mounted thereon, of a sub-lever segment in the rear of the type bar segment, and a series of sub-levers pivotally mounted thereon, and key levers and links for operating said sub-levers, the several sub-levers having depending lugs to which said links are connected, said sub-levers being arranged in radial planes and said lugs being arranged approximately in line with said links.

8. In a front strike typewriting machine, the combination with a segment comprising two segmental bars, one above and forward of the other, and type bars carried by said segmental bars, of a sub-lever segment in the rear of the type bar segment, and having two series of bearings, one series being above and forward of the other, and a series of sub-levers having their rear ends pivoted in the sub-lever segment and their forward ends connected with their respective type bars, successive sub-levers being pivoted alternately in the upper and lower bearings of the sub-lever segment and connected respectively to the type bars pivoted in the upper and lower segmental bars of the type bar segment.

9. In a typewriting machine, the combination with the key levers, of tension springs bearing upon said key levers respectively, a series of screws for adjusting the tension springs respectively, an adjustable bar in which said screws are mounted, a cover for said adjusting screws and bar removably connected to the frame of the machine, and means mounted in said cover for adjusting said bar whereby the springs of the key levers may be adjusted simultaneously.

10. In a typewriting machine, the combination with the type bar segment and a series of type bars pivotally mounted thereon between their ends and arranged to strike upwardly and rearwardly, of a sub-lever segment in the rear of the type bar segment, a series of substantially horizontal sub-levers pivotally mounted in the sub-lever segment and directly connected at their forward ends with the rear ends of the type bars, a series of key levers pivoted at their rear ends and underlying the type bars and sub-levers, and links connecting the key levers with intermediate parts of the sub-levers, the said segments being arranged in substantially vertical planes.

11. In a typewriting machine, the combination of a type bar arranged to strike upwardly and rearwardly, a segment upon which said type bar is pivoted between its ends, a sub-lever segment, a substantially horizontal sub-lever in the rear of the type bar, a direct connection between the forward end of the sub-lever and the rear end of the type bar, a key lever beneath the type bar and sub-lever, and a connection between the key lever and the sub-lever, the said segments being arranged in substantially vertical planes.

12. In a typewriting machine, the combination of a vertically arranged type bar segment, a series of type bars pivotally mounted thereon between their ends, a vertically arranged sub-lever segment in the rear of the type bar segment and having radial slots to receive sub-levers, a series of substantially horizontal sub-levers pivotally mounted in said slots and having their forward ends directly connected with the type-bars, key levers pivoted at their rear ends and arranged beneath the type bars and sub-levers, and connections between the sub-levers and key-levers.

13. In a typewriting machine, the combination of a type bar pivoted between its ends and arranged to strike upwardly and rearwardly, a sub-lever in rear of the type-bar and having a direct connection therewith, said type bar and sub-lever being substantially horizontal and occupying normally approximately the same horizontal plane, a key lever pivoted at its rear end and underlying the type bar and sub-lever, and a link connecting the key-lever and the sub-lever.

In testimony whereof we affix our signatures in presence of two witnesses.

FRANK J. TANNER.
EDWIN F. GRIFFIN.

Witnesses:
NELSON H. PROUTY,
I. ELVET JONES.